US010051564B2

(12) United States Patent
Tabatabai et al.

(10) Patent No.: US 10,051,564 B2
(45) Date of Patent: Aug. 14, 2018

(54) TRANSMITTER SIGNAL TIME AND FREQUENCY DIVISION DUPLEXING

(71) Applicant: Google Inc., Mountain View, CA (US)

(72) Inventors: Farbod Tabatabai, Menlo Park, CA (US); Eduardo Tinoco, Surprise, AZ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/359,251

(22) Filed: Nov. 22, 2016

(65) Prior Publication Data

US 2018/0146424 A1 May 24, 2018

(51) Int. Cl.
H04B 1/38 (2015.01)
H04L 7/00 (2006.01)
H04W 52/02 (2009.01)
H04L 5/14 (2006.01)
H04L 12/26 (2006.01)
H04L 5/00 (2006.01)
(Continued)

(52) U.S. Cl.
CPC ....... H04W 52/0206 (2013.01); H04L 1/0025 (2013.01); H04L 5/0048 (2013.01); H04L 5/14 (2013.01); H04L 43/16 (2013.01); H04J 11/00 (2013.01); H04W 52/52 (2013.01)

(58) Field of Classification Search
USPC .......... 375/219, 220, 221, 222, 240, 240.26, 375/240.27, 254, 259, 278, 267, 285, 284, 375/295, 299, 304, 316, 340, 346, 348, 375/349, 354
See application file for complete search history.

(56) References Cited

U.S. PATENT DOCUMENTS 5,526,348 A 6/1996 Ichiyoshi
6,978,149 B1 * 12/2005 Morelli ................ H04B 1/1615
455/522
(Continued)

FOREIGN PATENT DOCUMENTS

CN 102104390 A 6/2011
EP 2894792 A1 7/2015
(Continued)

OTHER PUBLICATIONS

International Search Report and Written Opinion for the related PCT Application No. PCT/US2017/054066 dated Dec. 15, 2017.

Primary Examiner — Linda Wong
(74) Attorney, Agent, or Firm — Honigman Miller Schwartz and Cohn LLP

(57) ABSTRACT

A method receiving an input signal at radio circuitry, sampling the input signal, and determining a power level of the sampled input signal. The radio circuitry includes an input switch having an input, a first output, and a second output. The input switch is configured to switch between the first output for the receive mode and the second output for the transmit mode. The method also includes determining whether the power level of the sampled input signal is greater than a threshold power level. When the power level of the sampled input signal is greater than the threshold power level, the method includes switching the input switch to the second output for the transmit mode. When the power level of the sampled input signal is less than or equal to the threshold power level, the method includes switching the input switch to the first output for the receive mode.

28 Claims, 9 Drawing Sheets

(51) Int. Cl.
 *H04L 1/00* (2006.01)
 *H04J 11/00* (2006.01)
 *H04W 52/52* (2009.01)

(56) References Cited

U.S. PATENT DOCUMENTS

| | | | |
|---|---|---|---|
| 7,639,752 B2 | 12/2009 | Demoulin et al. | |
| 7,904,108 B2* | 3/2011 | Castaneda | H03F 1/02 |
| | | | 455/114.3 |
| 8,035,397 B1* | 10/2011 | Jaoude | G01R 31/3679 |
| | | | 324/430 |
| 8,310,963 B2 | 11/2012 | Singh | |
| 9,166,533 B2* | 10/2015 | Marra | H03F 1/30 |
| 2004/0077316 A1* | 4/2004 | Xiong | H04B 1/46 |
| | | | 455/78 |
| 2006/0223462 A1* | 10/2006 | Rahman | H04B 1/04 |
| | | | 455/126 |
| 2007/0206523 A1* | 9/2007 | Huynh | H03G 3/001 |
| | | | 370/318 |
| 2008/0096514 A1* | 4/2008 | Rahman | H03H 11/1291 |
| | | | 455/307 |
| 2010/0027596 A1* | 2/2010 | Bellaouar | H03G 3/3047 |
| | | | 375/219 |
| 2012/0257661 A1* | 10/2012 | Murphy | G01R 31/021 |
| | | | 375/224 |
| 2013/0122956 A1* | 5/2013 | Lee | H04W 52/04 |
| | | | 455/522 |
| 2013/0176037 A1* | 7/2013 | Waki | G01D 9/005 |
| | | | 324/658 |
| 2013/0271260 A1* | 10/2013 | Tubb | E05B 39/00 |
| | | | 340/5.6 |
| 2014/0140455 A1* | 5/2014 | Mirzaei | H04B 1/006 |
| | | | 375/350 |
| 2015/0181363 A1* | 6/2015 | Khorami | H04B 1/0458 |
| | | | 370/297 |
| 2015/0248964 A1* | 9/2015 | Shirinfar | H01F 27/28 |
| | | | 330/252 |
| 2016/0211880 A1* | 7/2016 | Choi | H03F 3/19 |
| 2016/0381649 A1* | 12/2016 | Anthony | H03F 3/24 |
| | | | 455/127.2 |
| 2017/0141620 A1* | 5/2017 | Zeine | H02J 50/20 |

FOREIGN PATENT DOCUMENTS

| | | |
|---|---|---|
| KR | 10-0421960 B1 | 3/2004 |
| WO | 2014199380 A1 | 12/2014 |

* cited by examiner

TRANSMITTER SIGNAL TIME AND FREQUENCY DIVISION DUPLEXING

TECHNICAL FIELD

This disclosure relates to enabling a transmitter signal for time and frequency division duplexing.

BACKGROUND

Long-Term Evolution (LTE) is a standard for wireless communication of high-speed data for mobile phones and data terminals. LTE is based on the Global System for Mobile Communications/Enhanced Data Rates for GSM Evolution (GSM/EDGE) and Universal Mobile Telecommunication System/High Speed Packet Access (UMTS/HSPA) network technologies. LTE is configured to increase the capacity and speed of the telecommunication by using different ratio interfaces in addition to core network improvements. LTE supports scalable carrier bandwidths, from 1.4 MHz to 20 MHz and supports both frequency division duplexing (FDD) and time-division duplexing (TDD).

Generally, radio circuitry at base stations in LTE-FDD networks always power all of the components associated with transmitter circuitry even when the radio circuitry is not in use or is operating in a receive mode. As these components include one or more power amplifiers, these base stations are consuming large amounts during periods when the radio circuitry is not operating in a transmit mode.

SUMMARY

One aspect of the disclosure provides a method for switching between a receive mode and a transmit mode at radio circuitry. The method includes receiving, at radio circuitry, an input signal and sampling, by a signal coupler, the input signal. The method also includes determining, by a power detector, a power level of the sampled input signal and determining, by a comparer in communication with the radio circuitry, whether the power level of the sampled input signal is greater than a threshold power level. The radio circuitry includes an input switch having an input, a first output, and a second input. The input switch is configured to switch between the first input for the receive mode and the second output for the transmit mode. The radio circuitry also includes receive-circuitry electrically coupled to the first output of the input switch, the receive-circuitry configured to receive a receive-communication and transmit-circuitry electrically coupled to the second output of the input switch, the transmit-circuitry configured to transmit a transmit-communication. When the power level of the sampled input signal is greater than the threshold power level, the method includes switching the input switch to the second output for the transmit mode. When the power level of the sampled input signal is less than or equal to the threshold power level, the method includes switching the input switch to the first output for the receive mode.

Implementations of the disclosure may include one or more of the following optional features. In some implementations, the method includes receiving, at the comparer, a reference signal having a power level including the threshold power level. The comparer may be configured to compare the power level of the sampled input signal against the power level of the reference signal to determine whether the power level of the sampled input signal is greater than the threshold power level. The comparer may also include a comparator configured to receive the power level of the sampled input signal and the reference signal. The signal may include a radio frequency input signal. The power detector may include a root mean squared power detector. The threshold power level of the power level of the sampled input signal may be voltage values.

In some examples, the radio circuitry includes an output switch having an output, a first input electrically coupled to the receive-circuitry, and a second input electrically coupled to the transmit-circuitry. The output switch may be configured to switch between the first input for the receive mode and the second input for the transmit mode. The radio circuitry may also include a diplexer electrically coupled to the receive-circuitry and the transmit-circuitry. The diplexer may be configured to direct receive-communications to the receive-circuitry and direct transmit-communications from the transmit-circuitry to an output terminal for transmission from the radio circuitry. The diplexer may be used by the radio circuitry in lieu of the output switch.

The radio circuitry may also include a local oscillator in communication with the receive-circuitry and a first frequency converter. The local oscillator may be configured to provide a receiver oscillation frequency to the receiver-circuitry for the receive mode. The frequency converter may be configured to up-convert or down-convert the receive-communication received by the receive-circuitry for the receive mode. The frequency converter may use the receiver oscillation frequency provided from the local oscillator.

The radio circuitry may further include a local oscillator in communication with the transmit-circuitry and a frequency converter configured to up-convert or down-convert the transmit-communication for transmission from the transmit-circuitry for the transmit mode. The local oscillator may be configured to provide a transmitter oscillation frequency to the transmit-circuitry for the transmit mode. The second frequency converter may use the transmitter oscillation frequency provided from the local oscillator. The local oscillator providing the transmitter oscillation to the transmit-circuitry may be the same local oscillator providing the receiver oscillation frequency to the receive-circuitry.

In some examples, the comparer includes an analog-to-digital converter in communication with the power detector and a controller. The analog-to-digital converter may be configured to convert the power level of the sampled input signal from the analog domain to the digital domain. The controller may be configured to compare the power level of the sampled input signal output from the analog-to-digital converter in the digital domain against the threshold power level to determine whether the power level of the sampled input signal is greater than the threshold power level. The controller may include an onboard microcontroller, such as a field-programmable gate array (FPGA) integrated circuit or a complex programmable logic device (CPLD), having a general purpose input and output (GIPO) for enabling the one of the receive mode or the transmit mode and disabling the other one of the receive mode or the transmit mode based on the magnitude of the power level of the sampled input signal.

In some examples, the method includes sampling, by an output signal coupler, the transmit-communication output from a power amplifier of the transmit-circuitry for the transmit mode, determining, by an output power detector electrically coupled to the output signal coupler, a transmit power level of the sampled transmit-communication and converting, by the analog-to-digital converter in communication with the output power detector, the transmit power level of the sampled transmit-communication from the analog domain to the digital domain. The method may also include comparing, by the controller, the power level of the sampled input signal output from the analog-to-digital converter in the digital domain against the transmit power level of the sampled transmit-communication output from the analog-to-digital converter in the digital domain to determine attenuation tuning instructions based on a difference between the power level of the sampled input signal and the transmit power level of the sampled transmit-communication. The method may further include providing, by the controller, the attenuation tuning instructions to a digital step attenuator of the transmit-circuitry in communication with the controller, the attenuation tuning instructions causing the transmit-circuitry to increase or decrease a fixed output power for transmitting transmit-communications.

In some implementations, the comparer includes an analog-to-digital converter in communication with the power detector and a controller. The analog-to-digital converter may be configured to convert the sampled input signal from the analog domain to the digital domain. The controller may be configured to determine whether the sampled input signal output from the analog-to-digital circuit corresponds to a downlink packet or an uplink packet.

The receive-circuitry may receive the receive-communication from user equipment over a long-term evolution network and the transmit-circuitry may transmit the transmit-communication to the user equipment over the long-term evolution network. The input switch may switch to the first output for the receive mode by default. One or more power amplifiers at the transmit-circuitry may be powered off during the receive mode.

Another aspect of the disclosure provides a system including radio circuitry, a signal coupler, a power detector and a comparer. The radio circuitry includes an input switch, receive-circuitry and transmit-circuitry. The input switch has an input, a first output, and a second output. The input switch is configured to switch between the first output for a receive mode and the second output for a transmit mode. The receive-circuitry is electrically coupled to the first output of the input switch, the receive-circuitry configured to receive a receive-communication. The transmit-circuitry is electrically coupled to the second output of the input switch, the transmit-circuitry configured to transmit a transmit-communication. The signal coupler is configured to sample an input signal received at the input of the input switch. The power detector is electrically coupled to the signal coupler and configured to determine a power level of a sampled input signal. The comparer is electrically coupled to the power detector and determine whether the power level of the sampled input signal is greater than a power level of a reference signal. When the power level of the sampled input signal is greater than the power level of the reference signal, the comparer is configured to cause the input switch to switch to the first output for the receive mode and the second output for a transmit mode. When the power level of the sampled input signal is less than the power level of the reference signal, the comparer is configured to cause the input switch to switch to the second output for the transmit mode.

This aspect may include one or more of the following optional features. In some implementations, the comparer is configured to receive a reference signal having a power level comprising the threshold power level and compare the power level of the sampled input signal against the power level of the reference signal to determine whether the power level of the sampled input signal is greater than the threshold power level. The comparer may also include a comparator configured to receive the power level of the sampled input signal and the reference signal. The input signal may include a radio frequency input signal. The power detector may include a root mean squared power detector. The threshold power level of the power level of the sampled input signal may be voltage values.

In some examples, the radio circuitry includes an output switch having an output, a first input electrically coupled to the receive-circuitry, and a second input electrically coupled to the transmit-circuitry. The output switch may be configured to switch between the first input for the receive mode and the second input for the transmit mode. The radio circuitry may also include a diplexer electrically coupled to the receive-circuitry and the transmit-circuitry. The diplexer may be configured to direct receive-communications to the receive-circuitry and direct transmit-communications from the transmit-circuitry to an output terminal for transmission from the radio circuitry. The diplexer may be used in lieu of the output switch.

In some implementations, the radio circuitry includes a local oscillator in communication with the receive-circuitry and a frequency converter. The local oscillator is configured to provide a receiver oscillation frequency to the receiver-circuitry for the receive mode. The frequency converter may be configured to up-convert or down-convert the receive-communication received by the receive-circuitry for the receive mode, the frequency converter using the receiver oscillation frequency provided from the local oscillator.

The radio circuitry may further include a local oscillator in communication with the transmit-circuitry and a frequency converter. The local oscillator may be configured to provide a transmitter oscillation frequency to the transmit-circuitry for the transmit mode. The frequency converter may be configured to up-convert or down-convert the transmit-communication for transmission from the transmit-circuitry for the transmit mode, the second frequency converter using the transmitter oscillation frequency provided from the local oscillator. The local oscillator providing the transmitter oscillation to the transmit-circuitry may be the same local oscillator providing the receiver oscillation frequency to the receive-circuitry.

In some examples, the comparer includes an analog-to-digital converter in communication with the power detector and a controller. The analog-to-digital converter may be configured to convert the power level of the sampled input signal from the analog domain to the digital domain. The controller may be configured to compare the power level of the sampled input signal output from the analog-to-digital converter in the digital domain against the threshold power level to determine whether the power level of the sampled input signal is greater than the threshold power level. The controller may include an onboard microcontroller, such as a field-programmable gate array (FPGA) integrated circuit or a complex programmable logic device (CPLD), having a general purpose input and output (GIPO) for enabling the one of the receive mode or the transmit mode and disabling the other one of the receive mode or the transmit mode based on the magnitude of the power level of the sampled input signal.

In some implementations, the system includes an output signal coupler and an output power detector. The output signal coupler may be configured to sample the transmit-communication output from a power amplifier of the transmit-circuitry for the transmit mode. The output power detector may be electrically coupled to the output signal coupler and configured to determine a transmit power level of the sampled transmit-communication. The analog-to-digital converter may be in communication with the output power detector and further configured to convert the transmit power level of the sampled transmit-communication from the analog domain to the digital domain. The controller may be further configured to compare the power level of the sampled input signal output from the analog-to-digital converter in the digital domain against the transmit power level of the sampled transmit-communication output from the analog-to-digital converter in the digital domain to determine attenuation tuning instructions based on a difference between the power level of the sampled input signal and the transmit power level of the sampled transmit-communication. The controller may also be configured to provide the attenuation tuning instructions to a digital step attenuator of the transmit-circuitry in communication with the controller, the attenuation tuning instructions causing the transmit-circuitry to increase or decrease a fixed output power for transmitting transmit-communications.

The comparer may also include an analog-to-digital converter in communication with the power detector and a controller. The analog-to-digital converter may be configured to convert the sampled input signal from the analog domain to the digital domain. The controller may be configured to determine whether the sampled input signal output from the analog-to-digital circuit corresponds to a downlink packet or an uplink packet.

In some examples, the receive-circuitry receives the receive-communication from user equipment over a long-term evolution network and the transmit-circuitry transmits the transmit-communication to the user equipment over the long-term evolution network. The controller may cause the input to switch to the first output for the receive mode by default. One or more power amplifiers at the transmit-circuitry may be powered off during the receive mode.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Long Term Evolution (LTE) networks use a single frequency for communicating data between user equipment (UE), such as mobile phones, and base stations, providing coverage to the UEs. LTE networks may supports both frequency division duplexing (FDD) and time-division duplexing (TDD). Base stations (and/or wireless access points) in LTE networks may implement radio circuitry having receive-circuitry for receiving receive-communications from the UEs and transmit-circuitry for transmitting transmit-communications to the UEs. Generally, power consuming components, such as power amplifiers, at the transmit-circuitry are always powered on even during periods when the radio circuitry is not communicating with any UEs or when the radio circuitry is otherwise receiving communications from UEs. As a result, the transmit-circuitry is draining power from the base station during periods when transmit-circuitry is not in use. Implementations herein are directed toward powering off the components of the transmit-circuitry while not in use and operating the radio circuitry in a receive mode by default. The radio circuitry may receive radio frequency (RF) input signals to determine whether or not the RF input signal corresponds to a receive-communication or a transmit-communication. When an RF input signal corresponds to a transmit-communication, the radio circuitry may switch to a transmit mode whereby a path to the transmitter-circuitry is enabled and the power consuming components (e.g., power amplifier(s)) are powered on for transmitting the transmit-communication.

Figure 1A:
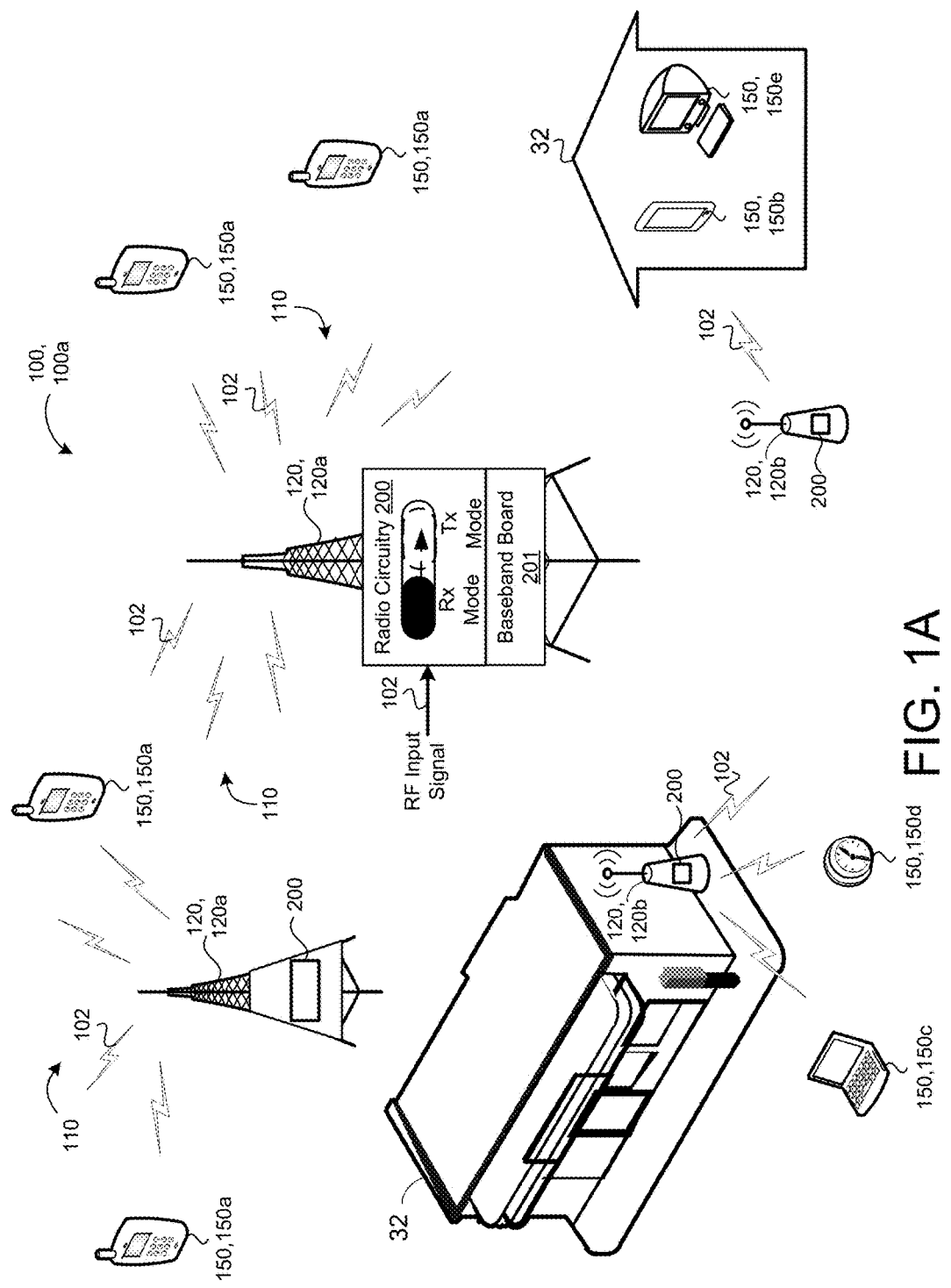
FIG. 1A is a schematic view of an example wireless network including an evolved packet core in communication with user equipment via one or more base stations.
Figure 1B:
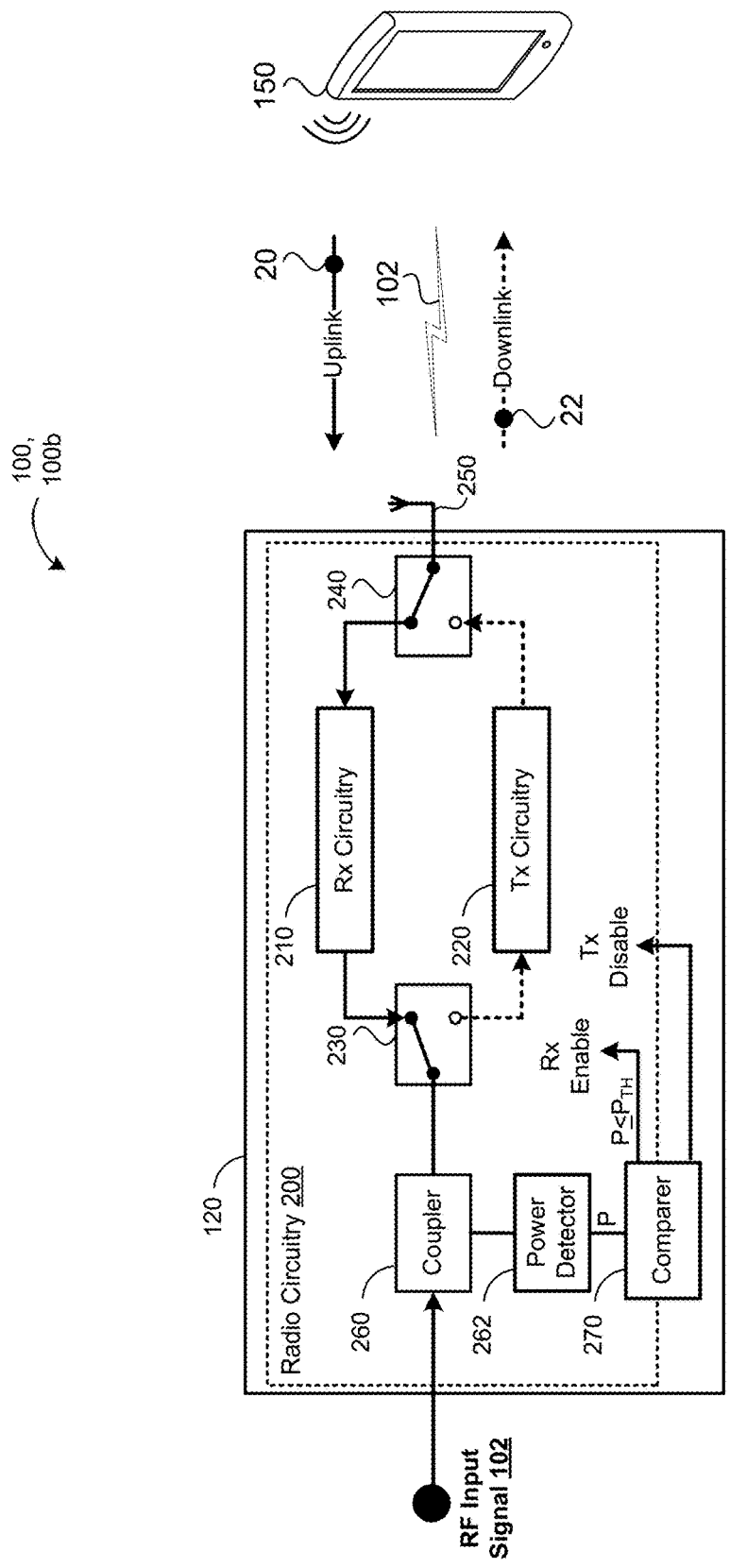
FIG. 1B is a schematic view of an example wireless network showing user equipment located in an area where three cells of coverage overlap.

Referring to FIGS. 1A and 1B, in some implementations, a network 100, 100a-b distributes radio frequency (RF) signals 102 between one or more communication terminals 120, 120a-b, such as base stations 110a and/or wireless access points 110b, and user equipment (UE) 150 configured to transmit and/or receive RF signals 102 over the network 100. In some examples, the network 100 is a Long Term Evolution (LTE) network supporting both frequency division duplexing (FDD) and time-division duplexing (TDD). LTE-TDD networks 100 use a single frequency for uploading and downloading information. LTE-TDD networks 100 operate at frequencies ranging from 1450 MHz to 4300 MHz, with several different bands being used. On the other hand, LTE-FDD networks 100 refer to the transmitting device (e.g., communication terminal 120) and the receive device (e.g., UE 150) operating at different carrier frequencies. In some implementations, the network 100 uses standard communications technologies and/or protocols. Thus, the network 100 can bridge various links using technologies related to connectivity, cellular, and/or microwave. For instance, the network 100 may use technologies, such as, but not limited to, Ethernet, Wireless Fidelity (WiFi) (e.g., IEEE 802.11 a,b,g,n,ac), worldwide interoperability for microwave access (WiMAX), 2G, 3G, 4G, LTE, digital subscriber line (DSL), asynchronous transfer mode (ATM), InfiniBand, Physical Cell Identifier (PCI) Express Advanced Switching, etc.

Referring to FIG. 1A, the communication terminals 120 correspond to RF transceivers (transmitter/receiver) for transmitting and receiving RF signals 102 to and from the user equipment 150. For instance, the base stations 120a (e.g., Evolved node B cells (eNBs)) communicate with the UEs 150 by transmitting/receiving the RF signals 102 (e.g., LTE signals) over an air interface 110 (i.e., Evolved Universal Terrestrial Radio Access (e-UTRA)) of 3GPP's LTE upgrade path for mobile networks. The LTE air interface 110 uses orthogonal frequency-division multiple access (OFDMA radio-access for the downlink (e.g., from the base station 120a to the UE 150) and Single-carrier FDMA (SC-FDMA) for the uplink (e.g., from the UE 150 to the base station 120a). Similarly, the wireless access points 120b may be implemented in local area networks (LANs) for directing data packets along one or more wireless communication links with the UEs 150. For instance, wireless access points 120b may wirelessly communicate with the UEs 150 using IEEE 802.11 technology by transmitting/receiving the RF signals 102 (WiFi signals) over a residential network that may include a personal area network (PAN), a local area network (LAN), a campus area network (CAN), or a metropolitan area network (MAN). The wireless access points 120b may reside in homes 32 and/or in-venues 34 and connect to an external network 100 via a network component such as a router, switch, bridge, mode, system controller.

The communication terminals 120 (e.g., base stations 120a and access points 120b) do not include a separate controller element for facilitating wireless communications with the UE 150 and, therefore, embed their own radio circuitry 200 for operating in a receive mode (e.g., Rx mode) to receive a receive-communication 20 (FIG. 1B) and operating in a transmit mode (e.g., Tx mode) to transmit a transmit-communication 22 (FIG. 1B). As used herein, receive-communications 20 refer to communications received by the radio circuitry 200 from the UE 150 via an uplink, while transmit-communications 22 refer to communications transmitted by the radio circuitry 200 to the UE 150 via a downlink. In some implementations, the radio circuitry 200 only enables one of the Rx mode or the Tx mode needed for use while disabling the other one of the Rx mode or the Tx mode not currently needed. More specifically, the radio circuitry 200 is configured to enable the Rx mode and disable the Tx mode when the radio circuitry 200 is to receive a receive-communication 20, as well as disable the Rx mode and enable the Tx mode when the radio circuitry 200 is to transmit a transmit-communication 22. In some examples, the radio circuitry 200 operates in the Rx mode by default, leaving the Tx mode disabled until the radio circuitry 200 needs to transmit the transmit-communication 22.

The radio circuitry 200 switches between the Rx mode and the Tx mode based solely upon an RF input signal 102 that indicates whether the radio circuitry 200 is to transmit the transmit-communication 22 to the UE 150 or receive the receive-communication 20 from the UE 150. For instance, a power level of the RF input signal 102 may indicate whether the radio circuitry 200 should switch from the Rx mode to the Tx mode. In other words, the radio circuitry 200 does not require additional digital signals from a corresponding baseband board 201 to control the operating mode of the radio circuitry 200, thereby reducing the number of signals and complexity to provide easy implementation and assembly into existing communication terminals 120. As used herein, the baseband board 201 contains components for baseband processing that is split between a transmitter board and a receiver board. The transmitter board handles downlink processing and enables coding, spreading, and modulation. The receiver board handles uplink processing and enables demodulation, de-spreading and decoding. The radio circuitry 200 and the baseband board 201 may communicate via a baseband interface.

Advantageously, the radio circuitry 200 may conserve power by not operating components associated with the corresponding Rx mode or the Tx mode that is not currently in use. For instance, conventional communication terminals 120 supporting FFD require that components, such as drivers and/or power amplifiers, associated with the Tx mode to always operate in an ON state. As a result, these conventional communication terminals 120 unnecessarily consume power during periods when the terminals are not actively transmitting transmit-communications 22.

UEs 150 may be any telecommunication device that is capable of transmitting and/or receiving voice/data over the network 100. UEs 150 may include, but are not limited to, mobile computing devices, such as laptops 150a, tablets 150b, smart phones 150c, and wearable computing devices 150d (e.g., headsets and/or watches). UEs 150 may also include other computing devices having other form factors, such as computing devices included in desktop computers 150e, vehicles, gaming devices, televisions, or other appliances (e.g., networked home automation devices and home appliances).

Referring to FIG. 1B, the network 100b shows the radio circuitry 200 of the communication terminal 120 configured to receive receive-communications 20 (e.g., uplink communications) from the UE 150 during the Rx mode and transmit transmit-communications 22 (e.g., downlink communications) to the UE 150 during the Tx mode. For instance, the radio circuitry 200 includes, or is coupled to, one or more antennas 250 from which RF signals 102 are communicated to and from the UE 150. In some examples, a single antenna 250 is used where a diplexer and filters are used to combine and separate RF signals 102 as needed.

The radio circuitry 200 includes receive-circuitry 210 (Rx Circuitry) configured to receive the receive-communication 20 from the UE 150 and transmit-circuitry 220 (Tx Circuitry) configured to transmit the transmit-communication 22 to the UE 150. The radio circuitry 200 may receive the input signal 102 and enable one of the receive-circuitry 210 or the transmit-circuitry 220 and disable the other one of the receive-circuitry 210 or the transmit-circuitry 220 based on the input signal 102. In some implementations, the radio circuitry 200 includes an input switch 230 configured to switch between operating the radio circuitry 200 in the Rx mode and the Tx mode. For instance, the input switch 230 may operate in a receive position (as shown in FIG. 1B) during the Rx mode to provide the functionality of the receive-circuitry 210 for receiving the receive-communication 20. On the other hand, the input switch 230 may transition to a transmit position when switching to the Tx mode to provide the functionality of the transmit-circuitry 220 for transmitting the transmit-communication 22. Additionally, the radio circuitry 200 may include an output switch 240 electrically coupled to the at least one antenna 250 and configured to operate between a receive position (as shown in FIG. 1B) during the Rx mode and a transmit position during the Tx mode. When the output switch 240 is in the receive position, the receive-circuitry 210 electrically couples to the antenna 250 while the transmit-circuitry 220 is decoupled from the antenna 250. On the other hand, the transmit-circuitry 220 electrically couples to the antenna 250 and the receive-circuitry 210 decouples from the antenna 250 when the output switch 240 transitions from the receive position to the transmit position.

In order to implement switching between the Rx mode and the Tx mode without relying on digital control signals, e.g., from the baseband board 201, the radio circuitry 200 includes a directional coupler 260 configured to sample the input signal 102 and a power detector 262 configured to determine a power level (P) of the sampled input signal 102. The sampled input signal 102 may include an RF input signal 102. Thereafter, a comparer 270 determines whether the power level (P) of the sampled input signal 102 is greater than a threshold power level ($P_{TH}$). When the power level of the sampled input signal 102 is less than or equal to the threshold power level, i.e., $P \leq P_{TH}$ the radio circuitry 200 operates in the Rx mode where the switches 230 are in their respective receive positions to provide the functionality of the receive-circuitry 210. Conversely, when the power level of the sampled input signal 102 is greater than the threshold power level, i.e., $P > P_{TH}$, the radio circuitry 200 operates in the Tx mode where the switches 230 are in their respective transmit positions to provide the functionality of the transmit-circuitry 220. In some examples, the radio circuitry 200 operates in the Rx mode by default and transitions to the Tx mode when the power level of the sampled input signal 102 becomes greater than the threshold power level. In some implementations, the radio circuitry 200 implements the comparer 270. In other implementations, the comparer 270 resides on another board (e.g., baseband board 201) or is associated with other circuitry of the corresponding communication terminal 120, and the radio circuitry 200 is in communication with the comparer 270 via an interface.

Figure 2A:
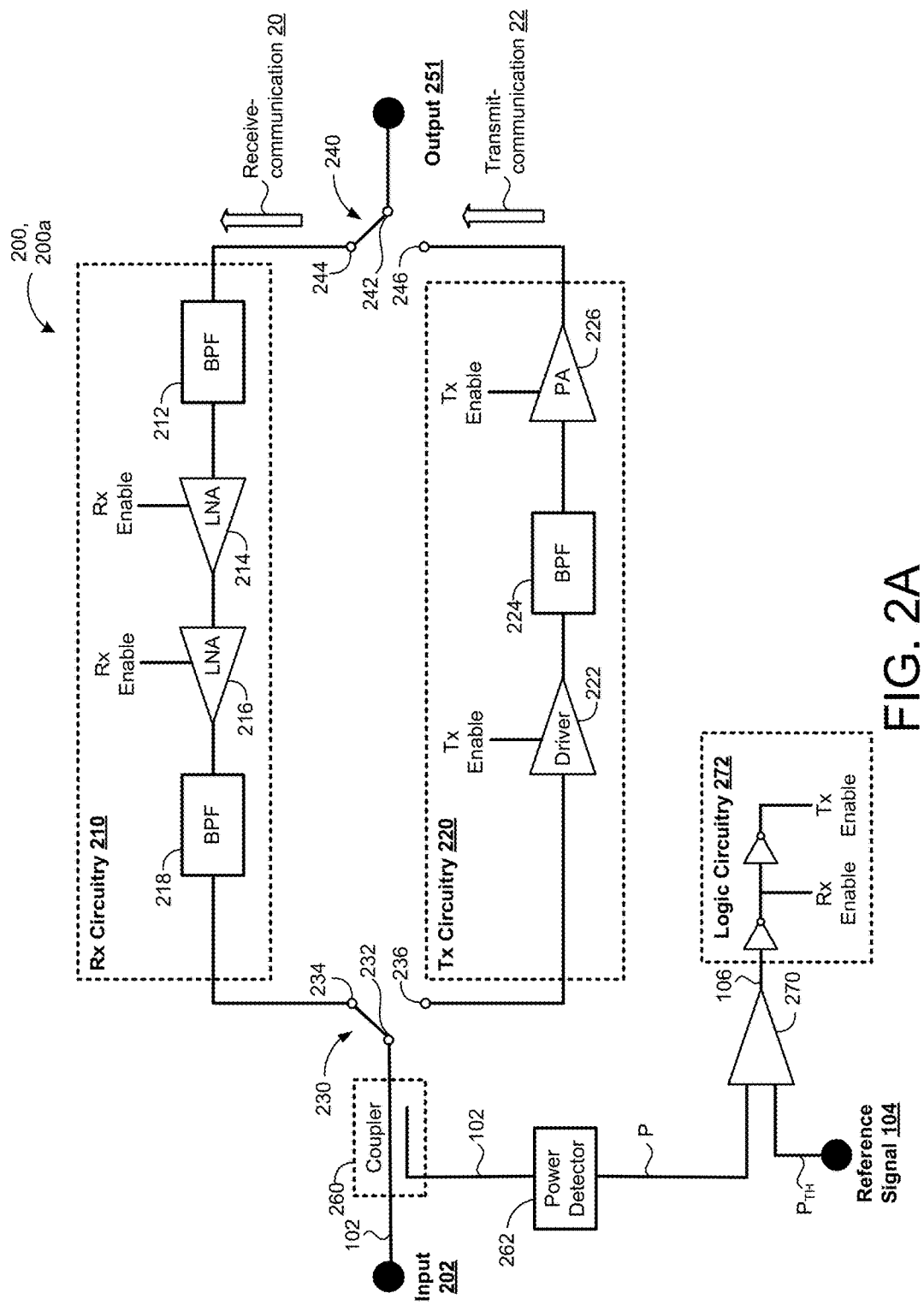
FIG. 2A is a schematic view of example radio circuitry including a directional coupler to sample an input signal.
Figure 2B:
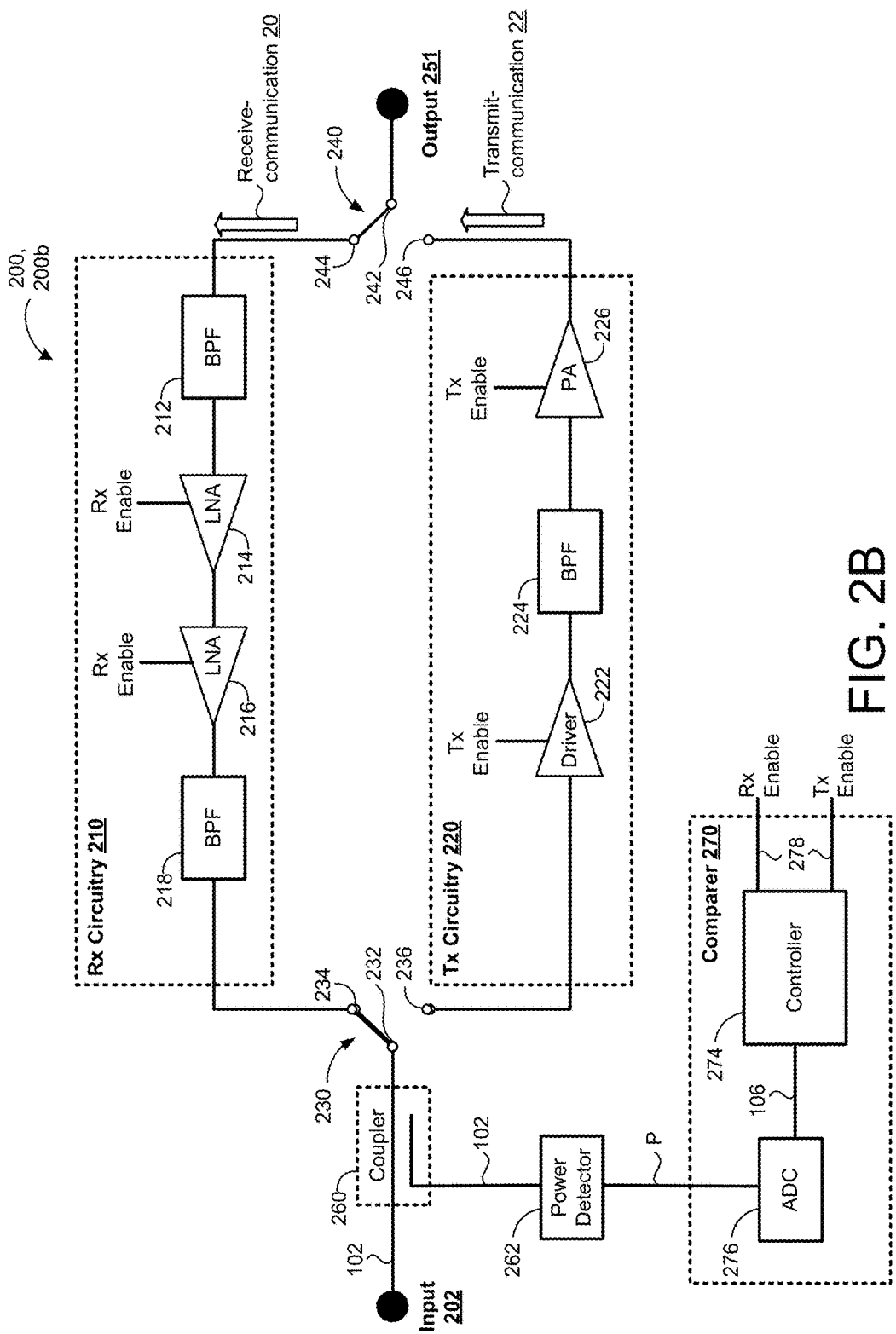
FIG. 2B is a schematic view of example radio circuitry including a directional coupler to sample an input signal and a controller to compare a power level of the sampled input signal.
Figure 2C:
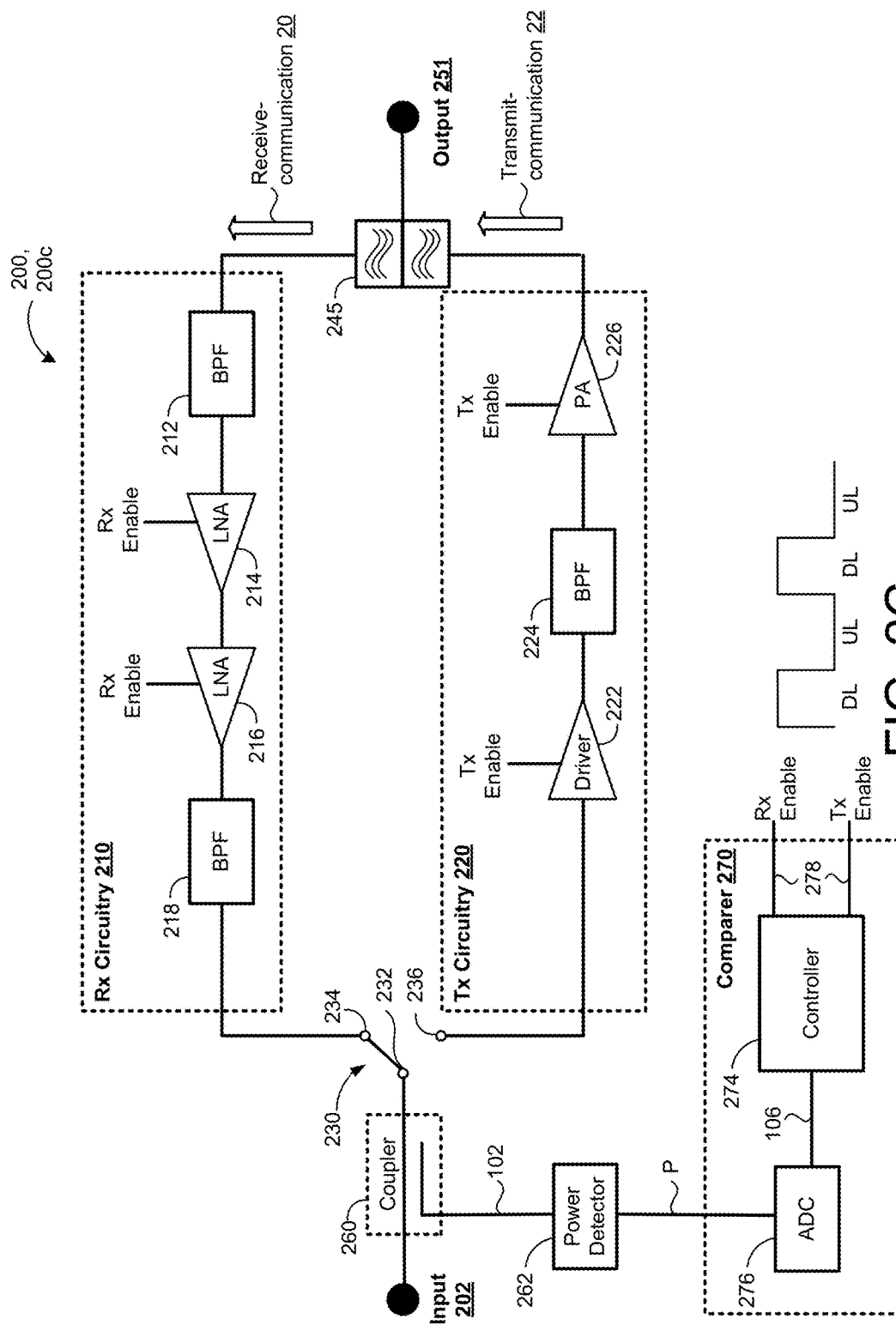
FIG. 2C is a schematic view of example radio circuitry including a directional coupler to sample an input signal and a controller to indicate whether the sampled input signal corresponds to an uplink packet or a downlink packet.

Additionally or alternatively, as shown in FIG. 2C, the comparer 270 may convert the sampled input signal 102 to the digital domain to determine whether the single corresponds to a downlink packet for transmitting transmit-communications 22 or an uplink packet for receiving receive-communications 20. Accordingly, the radio circuitry 200 may switch between the Rx mode and the Tx mode based on the input signal 102 containing a downlink packet or an uplink packet.

FIGS. 2A-2E illustrate example radio circuitry 200, 200a-e using the directional coupler 260 to sample the RF input signal 102 and transition between the receive mode and the transmit mode based on the RF input signal 102. The radio circuitry 200 includes an input terminal 202 for receiving the RF input signal 102, the receive-circuitry 210 (Rx Circuitry), the transmit-circuitry 220 (Tx Circuitry), the input switch 230, the output switch 240 (FIGS. 2A, 2B, 2D, 2E), and an output terminal 251 coupled to the one or more antennas 250 (FIG. 1B).

The input switch 230 includes an input 232, a first output 234 electrically coupled to the receive-circuitry 210, and a second output 236 electrically coupled to the transmit circuitry 220. The input switch 230 is configured to switch between the first output 234 for the receive mode and the second output 236 for the transmit-mode. Accordingly, the receive-circuitry 210 is configured to receive the receive-communication 20 when the input switch 230 switches to (or remains at) the first output 234. Here, the transmit-circuitry 220 is disabled when the input switch 230 switches to the first output 234. Conversely, the transmit-circuitry 220 is configured to transmit the transmit-communication 22 when the input switch 230 switches to the second output 236, whereby the receive-circuitry 210 is consequently disabled.

The output switch 240 (FIGS. 2A, 2B, 2D, 2E) includes a corresponding output 242 electrically coupled to the output terminal 251, a first input 244 electrically coupled to the receive-circuitry 210, and a second input 246 electrically coupled to the transmit-circuitry 220. The output switch 240 is configured to switch between the first input 244 for the receive mode and the second input 246 for the transmit-mode. In some implementations, the output switch 240 concurrently switches to the first input 244 when the input switch 230 switches to the first output 234 to provide the functionality of the receive-circuitry 210 for receiving the receive-communication 20, and concurrently switches to the second input 246 when the input switch 230 switches to the second output 236 to provide the functionality of the transmit-circuitry 220 for transmitting the transmit-communication 22. Accordingly, the receive-circuitry 210 is able to receive the receive-communication 20 by electrically coupling to the output terminal 251 when the output switch 240 switches to (or remains at) the first input 244. On the other hand, the transmit-circuitry 220 is able to transmit the transmit-communication 22 by electrically coupling to the output terminal 251 when the output switch 240 switches to the second input 246, whereby the receive-circuitry 210 is consequently disabled.

In the Rx mode, the radio circuitry 200 may receive a receive-communication 20 at the output terminal 251 via the antenna 250 and provide the receive-communication 20 to the receive-circuitry 210 via the output switch 240. As used herein, the receive-communication 20 corresponds to an uplink or inbound RF signal. The radio circuitry 200 may receive the receive-communication 20 from the UE 150. The receive-circuitry 210 includes a first band-pass filter (BPF) 212 that filters out any out-of-band signals included in the receive-communication 20. The first BPF 212 then provides the filtered receive-communication 20 to a first low noise amplifier (LNA) 214, which amplifies the receive-communication 20. The receive-circuitry 210 may also include a second LNA 216 downstream from the first LNA 214 and configured to further amplify the receive-communication 20. Thereafter, the amplified receive-communication 20 may be further filtered by a second BPF 218 for additional filtering. The filtered and amplified receive-communication 20 may exit the radio circuitry 200 at the input terminal 202 via the input switch 230 for digital processing. For instance, the receive-communication 20 may pass through an analog-to-digital (ADC) converter box for converting the receive-communication 20 from the analog domain to the digital domain for producing digital reception formatted data for digital processing at the baseband board 201. Thereafter, the baseband board 201 may convert the receive-communication 20 from the analog domain to the digital domain for producing digital reception formatted data.

In the Tx mode, the transmit circuitry 220 may provide the transmit-communication 22 to the output terminal 251 via the output switch 240 and the radio circuitry 200 may transmit the transmit-communication 22 via the antenna 250 to the UE 150. As used herein, the transmit-communication 22 corresponds to a downlink or outbound RF signal. Accordingly, the transmit-circuitry 220 may receive the transmit-communication 22 as the RF input signal 102 from the input terminal 202 via the input switch 230. For instance, the baseband board 201 or an intermediary converter between the baseband board 201 and the radio circuitry 200 may provide the RF input signal 102 corresponding to the transmit-communication 22 to the input terminal 202. The transmit circuitry 220 includes a driver amplifier 222 to amplify the transmit-communication 22 and a BPF 224 to filter out any out-of-band signals included in the transmit-communication 22. Thereafter, the filtered transmit-communication 22 is provided to a power amplifier 226 to amplify the power level of the transmit-communication 22 before transmission to the UE 150 via the antenna 250.

The radio circuitry 200 is configured to switch between the Rx mode and the Tx mode based upon the RF input signal 102 received at the input terminal 202. Accordingly, when the radio circuitry 200 switches (e.g., via the input and output switches 230, 240, respectively) to the Tx mode from the Rx mode, the Rx mode is disabled. Similarly, when the radio circuitry 200 switches to the Rx mode from the Tx mode, the Tx mode is disabled. The first and second LNAs 214, 216 are unpowered to an OFF state when the Rx mode is disabled. Likewise, the driver amplifier 222 and the power amplifier 226 are unpowered to OFF states when the Tx mode is disabled. Advantageously, less power is consumed by the communication terminal 120 when the components of the transmit-circuitry 220 are unpowered while not in use or the components of the receive-circuitry 210 are unpowered while not in use.

In some implementations, the directional coupler 260 samples the RF input signal 102 and the power detector 262 determines the power level P of the sampled RF input signal 102. In some examples, the power detector 262 includes a root mean squared (RMS) power detector configured to measure the power level P of the sampled RF input signal 102. Thereafter, the comparer 270 determines whether or not the power level P of the sampled RF input signal 102 is greater than a threshold power level $P_{TH}$.

Referring to FIG. 2A, in some implementations, the comparer 270 includes a comparator that compares the power level P of the sampled RF input signal 102 output from the power detector 262 (e.g., RMS power detector) to a power level of a reference signal 104. Here, the power level of the reference signal 104 includes the threshold power level ($P_{TH}$). The power levels input to the comparator 270 may include voltage levels/values. In some examples, the comparator 270 outputs a digital signal 106 indicating whether or not the power level P of the sampled RF input signal 102 is greater than the threshold power level $P_{TH}$ provided by the reference signal 104. In some examples, the comparator 270 provides the digital signal 106 to logic circuitry 272 configured to switch the input switch 230 and the output switch 240 to enable one of the Rx mode or the Tx mode and disable the other one of the Rx mode or the Tx mode. For instance, when the digital signal 106 indicates that the power level P of the sampled RF input signal 102 is greater than the threshold power level $P_{TH}$), then the logic circuitry 272 may enable the Tx mode by switching the input switch 230 to the second output 236 and the output switch 240 to the second input 246 to provide the functionality of the Tx circuitry 220. Accordingly, the driver 222 and the power amplifier 226 of the Tx circuitry 220 may be powered to an ON state and the LNAs 214, 216 of the Rx circuitry 210 may be unpowered to the OFF state. The radio circuitry 200a of FIG. 2A may provide a repeater.

Referring to FIGS. 2B and 2C, in some implementations, the comparer 270 includes a controller 274 and an analog-to-digital converter (ADC) 276. The power level of the sampled RF input signal 102 output from the power detector 262 (e.g., RMS power detector) is input to the ADC 276 for conversion to the digital domain. Accordingly, the ADC 276 outputs a digital signal 106 that includes the power level of the input RF input signal 102 and the controller 274 receives the digital signal 106 for determining whether or not the power level P of the sampled RF input signal 102 is greater than the threshold power level $P_{TH}$. The controller 274 may include an onboard microcontroller, such as a field-programmable gate array (FPGA) integrated circuit or a complex programmable logic device (CPLD), having a general purpose input and output (GIPO) 278 for enabling the one of the Rx mode or the Tx mode and disabling the other one of the Rx mode or the Tx mode based on the magnitude of the power level of the sampled RF input signal 102.

For FDD applications, the comparer 270 may additionally distinguish whether the RF input signal 102 corresponds to a downlink packet (DL) or an uplink packet (UL). FIG. 2C shows the digital signal 106 output from the ADC 276 indicating whether the RF input signal 102 corresponds to the uplink packet or the downlink packet. For instance, the digital signal 106 indicating the uplink packet may cause the controller 274 to enable Rx mode and disable the Tx mode via the GIPO 278. Conversely, the digital signal 106 indicating the downlink packet may cause the controller 274 to disable the Rx mode and enable the Tx mode via the GIPO 278. Here, the controller 274 may enable the Tx mode by switching the input switch 230 to the second output 236 and the output switch 240 to the second input 246 to provide the functionality of the Tx circuitry 220. Accordingly, the driver 222 and the power amplifier 226 of the Tx circuitry 220 may be powered to an ON state and the LNAs 214, 216 of the Rx circuitry 210 may be unpowered to the OFF state. In some examples, the radio circuitry 200c of FIG. 2C uses a diplexer 245 in lieu of the output switch 240 to transmit the transmit-communications 22 and to receive the receive-communications 20. Here, the diplexer 245 is electrically coupled to the Rx Circuitry 210, the Tx Circuitry 220, and the output terminal 251. The diplexer 245 is configured to direct uplink RF signals 102 (e.g., receive-communications 20) to the Rx Circuitry 210 and downlink RF signals 102 (e.g., transmit-communications) to the output terminal 251 for transmission by the at least one antenna 250. The radio circuitries 200b, 200c may provide repeaters.

Figure 2D:
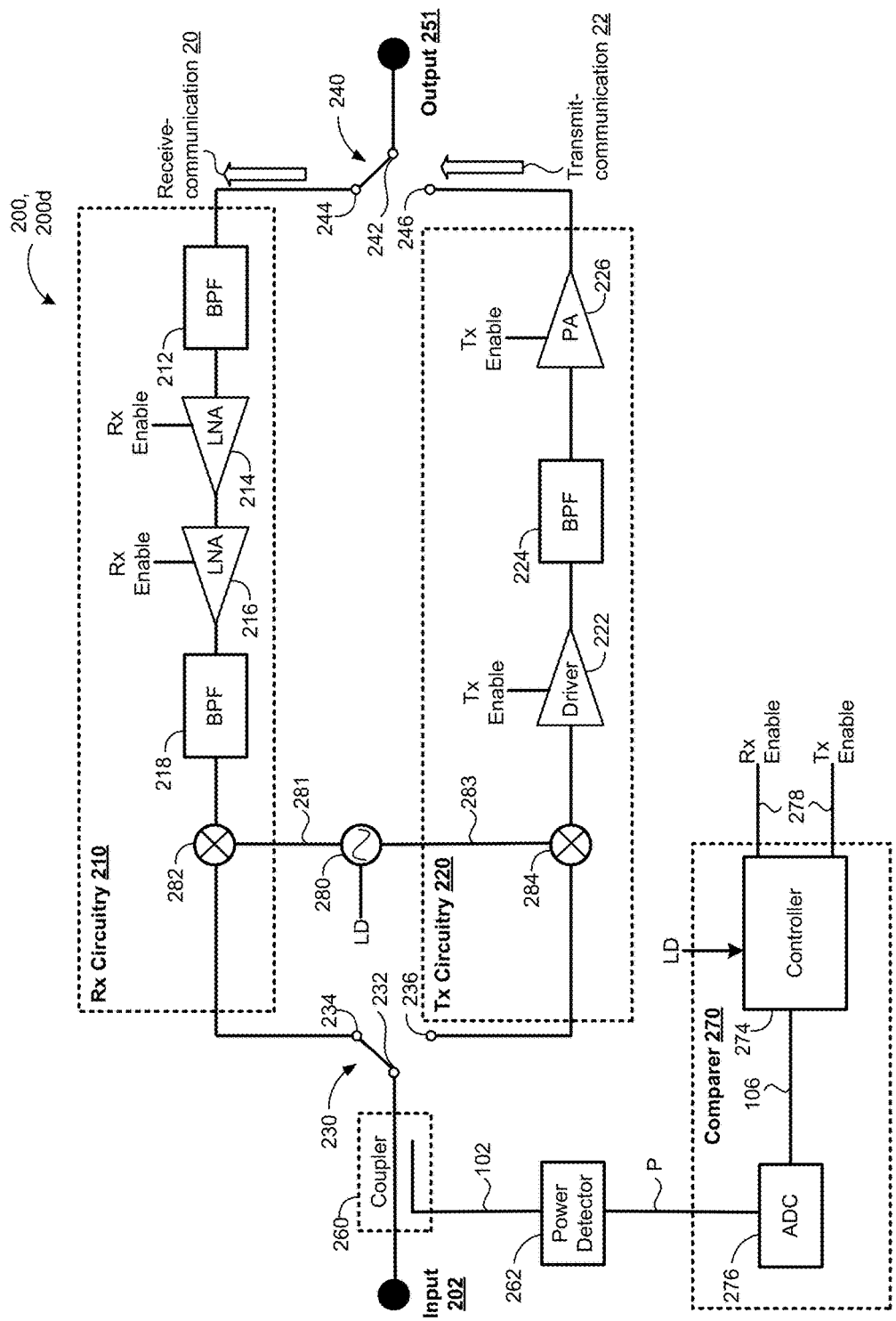
FIG. 2D is a schematic view of example radio circuitry including a directional coupler to sample an input signal and a local oscillator to provide oscillation frequencies to receiver-circuitry and transceiver-circuitry of the radio circuitry.
Figure 2E:
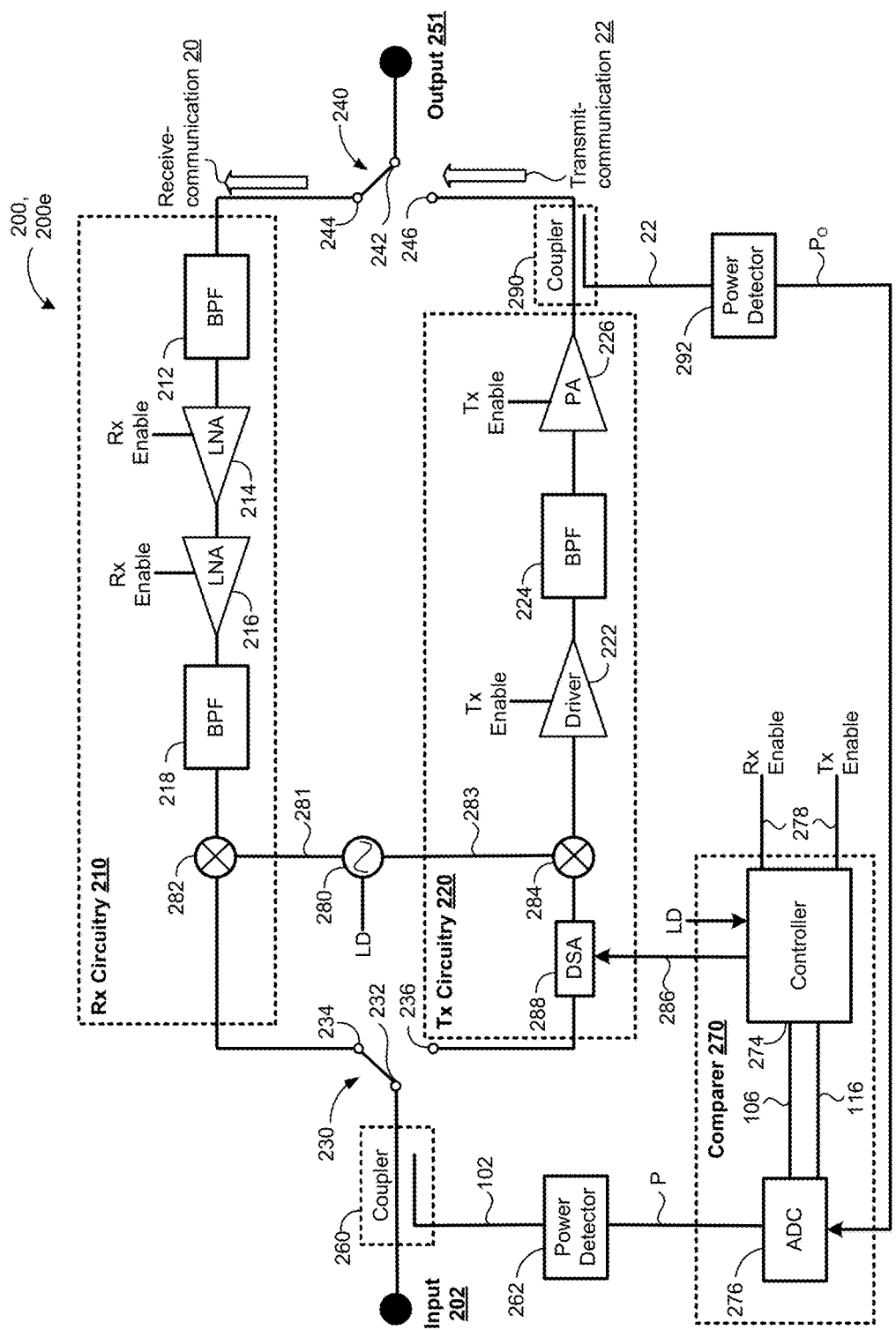
FIG. 2E is a schematic view of example radio circuitry including a directional coupler to sample an input signal, an output directional coupler to sample a transmit-communication, and a controller configured to adjust a fixed power of transmit-circuitry based on the sampled input signal and the sampled transmit-communication.

Referring to FIGS. 2D and 2E, in some implementations, the radio circuitry 200d, 200e implements up/down converters for converting frequency signals. For instance, the radio circuitry 200d, 200e may convert any low frequency signals with different standards (e.g., IEEE 802.11 a,b,g,n,ac, 802.16, etc.) to other high frequency signals, such as high frequency signals on an unlicensed band (e.g., Ku band, Ka band, V band, or E band), or even lower frequency signals (e.g., military band).

In some examples, the radio circuitry 200d, 200e includes a local oscillator 280 configured to provide a receiver oscillation frequency 281 in a frequency lock detect LD to the receiver-circuitry 210. For instance, in the Rx mode, the receiver-circuitry 210 directs the receive-communication 20 amplified by the LNAs 214, 216 and filtered by the second BPF 218 to a first frequency converter 282. In some configurations, the first frequency converter 282 includes a mixer that either down-converts or up-converts the frequency of the receive-communication 20 using the receiver oscillation frequency 281 provided by the local oscillator 280.

The local oscillator 280 is further configured to provide a transmitter oscillation frequency 283 in the frequency lock detect LD to the transmit-circuitry 220. For instance, in the Tx mode, the transmit-circuitry 220 directs the RF input signal 102 corresponding to the transmit-communication 22 from the second output 236 of the input switch 230 to a second frequency converter 284. In some configurations, the second frequency converter 284 includes a mixer that either up-converts or down-converts the frequency of the transmit-communication 22 using the transmitter oscillation frequency 283 provided by the local oscillator 280. Thereafter, the up- or down-converted transmit-communication 22 is provided to the amplification driver 222, the BPF 224, and the power amplifier 226 before transmission to the target UE 150. Additionally or alternatively, the LD may be provided to the controller 274 for locking the oscillation frequency provided to each of the frequency converters 282 and 284.

Referring to FIG. 2E, in some implementations, the up/down frequency converters 282 and 284 are fixed gain converters for use in LTE mobile communications. Thus, variances in frequencies input to the radio circuitry 200e will result in variances in the frequencies output from the radio circuitry 200e. In some scenarios, the radio circuitry 200e adjusts for a fixed output power. In these scenarios, the radio circuitry 200e may include an output directional coupler 290 disposed at the output of the power amplifier 226 of the transmit-circuitry 220 for sampling the transmit-communication 22 (e.g., an RF signal) output from the power amplifier 226. Thereafter, an output power detector 292 determines a power level (Po) of the sampled transmit-communication 22 and provides the Po to the ADC 276 of the comparer 270 for conversion into the digital domain. Here, the controller 274 receives a first digital signal 106 corresponding to the power level P of the input signal 102 and a second digital signal 116 corresponding to the power level Po of the sampled transmit-communication 22. In some implementations, the controller 274 is configured to provide attenuation tuning instructions 286 to a digital step attenuator (DSA) 288 of the transmit-circuitry 220 for increasing/decreasing the fixed gain or fixed power based on a difference between the power level P of the input signal 102 and the power level Po of the sampled transmit-communication 22. The controller 274 may provide the attenuation tuning instructions 286 to the DSA 288 over a serial or parallel interface.

Figure 3:
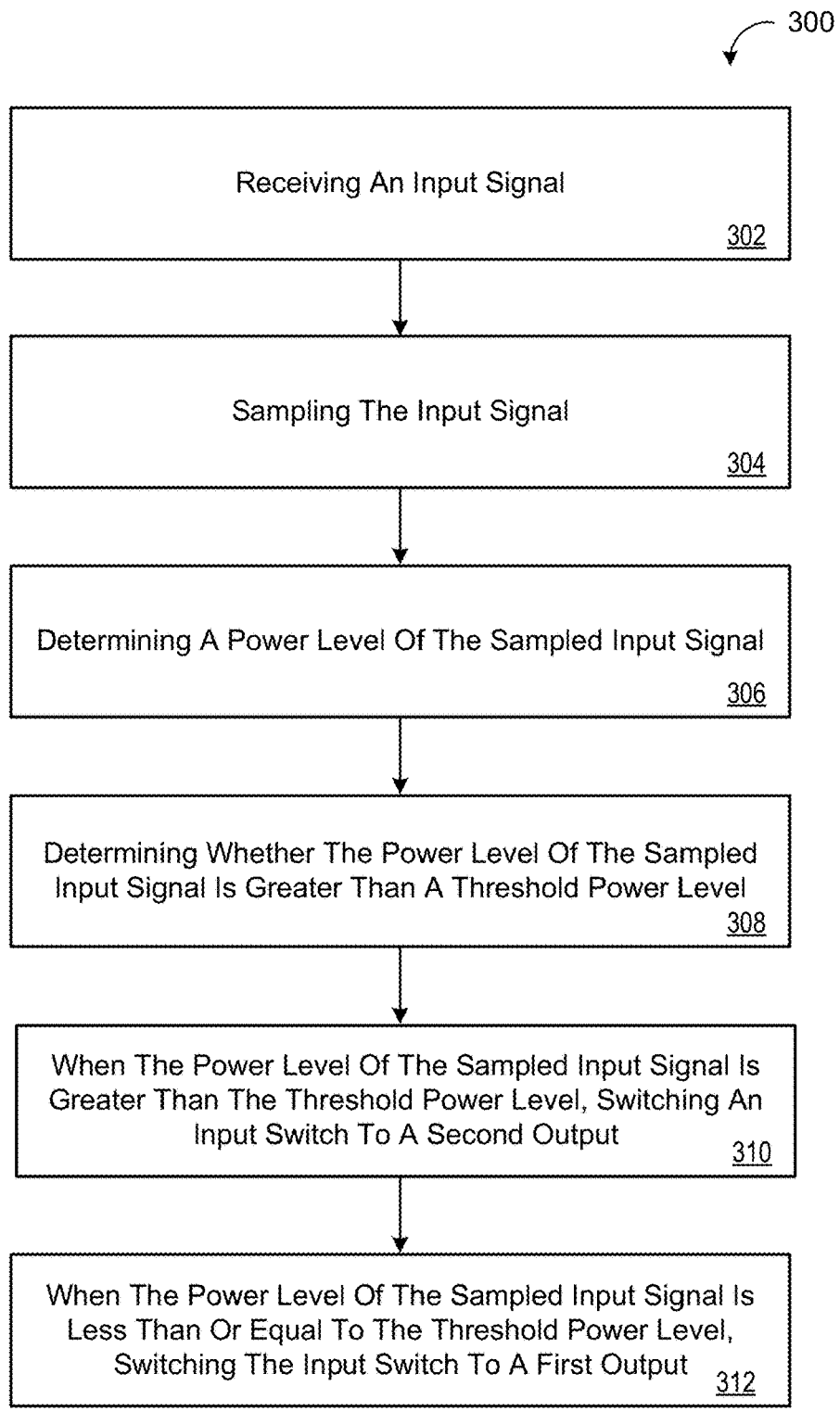
FIG. 3 is a flow chart of an example method for switching between a receive mode and a transmit mode based on an input signal received at radio circuitry.

FIG. 3 provides an example arrangement of operations for a method 300 of switching between a receive-mode and a transmit-mode at radio circuitry 200 based on an input signal 102 received at the radio circuitry 200. At block 302, the method 300 includes receiving, at the radio circuitry 200, the input signal 102. The radio circuitry 200 includes an input switch 230 having an input 232, a first output 234, and a second output 236. The input switch 230 is configured to switch between the first output 234 for the receive mode and the second output for the transmit mode. The radio circuitry 200 also includes receive-circuitry 210 electrically coupled to the first output 234 of the input switch 230, and transmit-circuitry 220 electrically coupled to the second output 236 of the input switch 230. The receive-circuitry 210 is configured to receive a receive-communication 20 and the transmit-circuitry 220 is configured to transmit a transmit-communication. At block 304, the method 300 includes sampling, by a signal coupler 260, the input signal 102, and at block 306, the method 300 includes determining, by a power detector 262, a power level P of the sampled input signal 102.

At block 308, the method 300 includes determining, by a comparer 270 in communication with the radio circuitry 200, whether the power level P of the sampled input signal 102 is greater than a threshold power level $P_{TH}$. At block 310, the method 300 includes switching the input switch 230 to the second output 236 for the transmit mode when the power level P of the sampled input signal 102 is greater than the threshold power level $P_{TH}$. Conversely, when the power level P of the sampled input signal 102 is less than or equal to the threshold power level $P_{TH}$), the method 300 includes, at block 312, switching the input switch 230 to the first output 234 for the receive mode. The input switch 230 may switch to the first output 234 by default until the power level P of the sampled input signal 102 is greater than the threshold power level $P_{TH}$.

Figure 4:
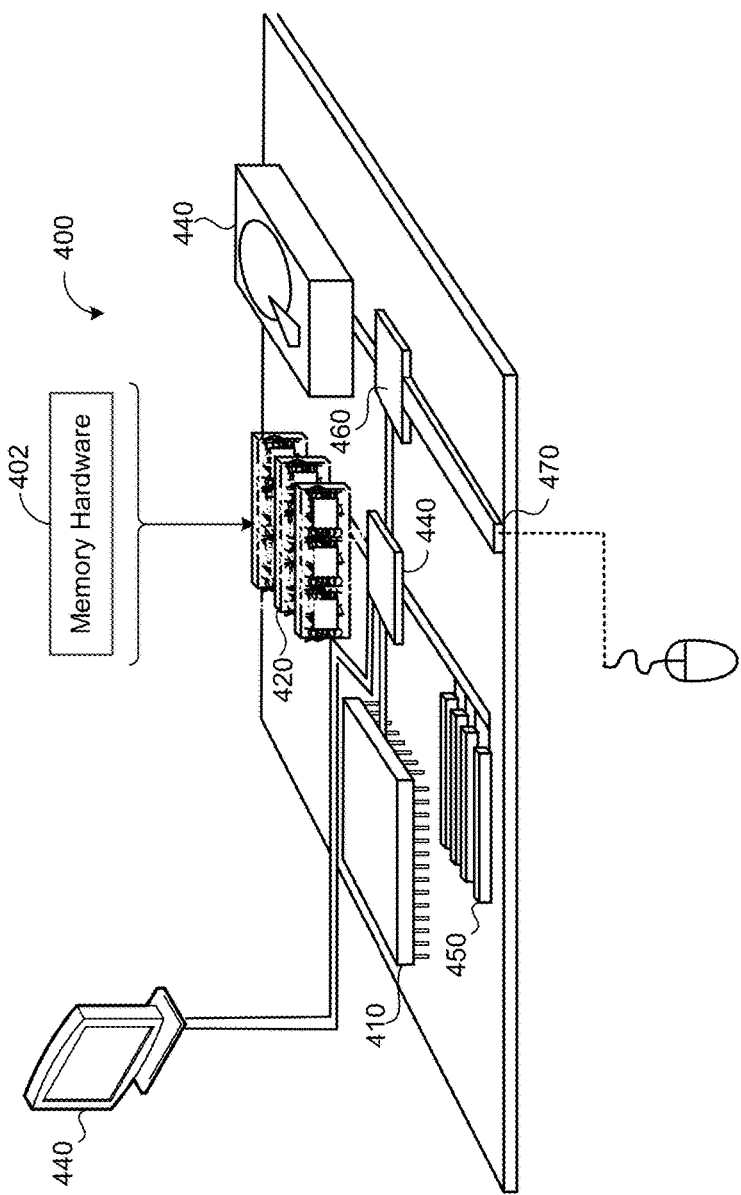
FIG. 4 is a schematic view of an example computing device.

FIG. 4 is a schematic view of an example of the control hardware 400 that may be used to implement the systems and methods described in this document. The control hardware 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The control hardware 400 includes a processor 450, memory 420, a storage device 430, a high-speed interface/controller 440 connecting to the memory 420 and high-speed expansion ports 450, and a low speed interface/controller 460 connecting to a low speed bus 470 and storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a GUI on an external input/output device, such as a display 480 coupled to a high speed interface 440. In other implementations, multiple processors and/or multiple buses may be used, as appropriate, along with multiple memories and types of memory. Also, multiple control hardware devices 400 may be connected, with each device providing portions of the necessary operations (e.g., as a server bank, a group of blade servers, or a multi-processor system).

The memory 420 includes hardware that stores information non-transitorily within the control hardware 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the control hardware 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), phase change memory (PCM).

The storage device 430 is capable of providing mass storage for the control hardware 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and low-speed expansion port 470. The low-speed expansion port 470, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The control hardware 400 may be implemented in a number of different forms, as shown in the figure. For example, it may be implemented as a standard server or multiple times in a group of such servers, as a laptop computer, or as part of a rack server system. In other implementations, the control hardware includes an FGPA or CPLD, a digital signal processor (DSP), or any other suitable circuitry. For instance, the control hardware 400 may implement the radio circuitry 200 including the comparer 270. In the examples of FIGS. 2B-2E, the comparer 270 includes the ADC 276 and the controller 274 for analyzing the RF input signal 102.

A software application (i.e., a software resource 110s) may refer to computer software that causes a computing device to perform a task. In some examples, a software application may be referred to as an "application," an "app," or a "program." Example applications include, but are not limited to, mobile applications, system diagnostic applications, system management applications, system maintenance applications, word processing applications, spreadsheet applications, messaging applications, media streaming applications, social networking applications, and gaming applications.

The memory hardware 110hm may be physical devices used to store programs (e.g., sequences of instructions) or data (e.g., program state information) on a temporary or permanent basis for use by a computing device 110hc. The non-transitory memory 110hm may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at radio circuitry, an input signal, the radio circuitry comprising:
an input switch having an input, a first output, and a second output, the input switch configured to switch between the first output for a receive mode and the second output for a transmit mode;
receive-circuitry electrically coupled to the first output of the input switch, the receive-circuitry configured to receive a receive-communication; and
transmit-circuitry electrically coupled to the second output of the input switch, the transmit-circuitry configured to transmit a transmit-communication;
sampling, by a signal coupler, the input signal;
determining, by a power detector, a power level of the sampled input signal;
determining, by a comparer in communication with the radio circuitry, whether the power level of the sampled input signal is greater than a threshold power level, wherein the comparer comprises:
an analog-to-digital converter in communication with the power detector, the analog-to-digital converter configured to convert the power level of the sampled input signal from the analog domain to the digital domain; and
a controller configured to compare the power level of the sampled input signal output from the analog-to-digital converter in the digital domain against the threshold power level to determine whether the power level of the sampled input signal is greater than the threshold power level;
when the power level of the sampled input signal is greater than the threshold power level, switching the input switch to the second output for the transmit mode; and
when the power level of the sampled input signal is less than or equal to the threshold power level, switching the input switch to the first output for the receive mode.

2. The method of claim 1, further comprising receiving, at the comparer, a reference signal having a power level comprising the threshold power level, the comparer configured to compare the power level of the sampled input signal against the power level of the reference signal to determine whether the power level of the sampled input signal is greater than the threshold power level.

3. The method of claim 2, wherein the comparer comprises a comparator configured to receive the power level of the sampled input signal and the reference signal.

4. The method of claim 1, wherein the input signal comprises a radio frequency input signal.

5. The method of claim 1, wherein the power detector comprises a root mean squared power detector.

6. The method of claim 1, wherein the radio circuitry further comprises an output switch having an output, a first input electrically coupled to the receive-circuitry, and a second input electrically coupled to the transmit-circuitry, the output switch configured to switch between the first input for the receive mode and the second input for the transmit mode.

7. The method of claim 1, wherein the radio circuitry further comprises a diplexer electrically coupled to the receive-circuitry and the transmit-circuitry, the diplexer configured to direct receive-communications to the receive-circuitry and direct transmit-communications from the transmit-circuitry to an output terminal for transmission from the radio circuitry.

8. The method of claim 1, wherein the radio circuitry further comprises:
a local oscillator in communication with the receive-circuitry, the local oscillator configured to provide a receiver oscillation frequency to the receiver-circuitry for the receive mode; and
a frequency converter configured to up-convert or down-convert the receive-communication received by the receive-circuitry for the receive mode, the frequency converter using the receiver oscillation frequency provided from the local oscillator.

9. The method of claim 1, wherein the radio circuitry further comprises:
a local oscillator in communication with the transmit-circuitry, the local oscillator configured to provide a transmitter oscillation frequency to the transmit-circuitry for the transmit mode; and
a frequency converter configured to up-convert or down-convert the transmit-communication for transmission from the transmit-circuitry for the transmit mode, the second frequency converter using the transmitter oscillation frequency provided from the local oscillator.

10. The method of claim 1, further comprising:
sampling, by an output signal coupler, the transmit-communication output from a power amplifier of the transmit-circuitry for the transmit mode;
determining, by an output power detector electrically coupled to the output signal coupler, a transmit power level of the sampled transmit-communication;
converting, by the analog-to-digital converter in communication with the output power detector, the transmit power level of the sampled transmit-communication from the analog domain to the digital domain;
comparing, by the controller, the power level of the sampled input signal output from the analog-to-digital converter in the digital domain against the transmit power level of the sampled transmit-communication output from the analog-to-digital converter in the digital domain to determine attenuation tuning instructions based on a difference between the power level of the sampled input signal and the transmit power level of the sampled transmit-communication; and
providing, by the controller, the attenuation tuning instructions to a digital step attenuator of the transmit-circuitry in communication with the controller, the attenuation tuning instructions causing the transmit-circuitry to increase or decrease a fixed output power for transmitting transmit-communications.

11. The method of claim 1, wherein the comparer comprises:
an analog-to-digital converter in communication with the power detector, the analog-to-digital converter configured to convert the sampled input signal from the analog domain to the digital domain; and
a controller configured to determine whether the sampled input signal output from the analog-to-digital circuit corresponds to a downlink packet or an uplink packet.

12. The method of claim 1, wherein the receive-circuitry receives the receive-communication from user equipment over a long-term evolution network and the transmit-circuitry transmits the transmit-communication to the user equipment over the long-term evolution network.

13. The method of claim 1, wherein the input switch switches to the first output for the receive mode by default.

14. The method of claim 1, wherein one or more power amplifiers at the transmit-circuitry are powered off during the receive mode.

15. A system comprising:
radio circuitry comprising:
an input switch having an input, a first output, and a second output, the input switch configured to switch between the first output for a receive mode and the second output for a transmit mode;
receive-circuitry electrically coupled to the first output of the input switch, the receive-circuitry configured to receive a receive-communication; and
transmit-circuitry electrically coupled to the second output of the input switch, the transmit-circuitry configured to transmit a transmit-communication;
a signal coupler configured to sample an input signal received at the input of the input switch;
a power detector electrically coupled to the signal coupler and configured to determine a power level of a sampled input signal; and
a comparer electrically coupled to the power detector, the comparer comprising:
an analog-to-digital converter in communication with the power detector, the analog-to-digital converter configured to convert the power level of the sampled input signal from the analog domain to the digital domain; and
a controller configured to compare the power level of the sampled input signal output from the analog-to-digital converter in the digital domain against the threshold power level to determine whether the power level of the sampled input signal is greater than the threshold power level,
wherein the comparer is configured to:
determine whether the power level of the sampled input signal is greater than a power level of a reference signal;
when the power level of the sampled input signal is greater than the power level of the reference signal, cause the input switch to switch to the first output for the receive mode and the second output for a transmit mode; and
when the power level of the sampled input signal is less than the power level of the reference signal, cause the input switch to switch to the second output for the transmit mode.

16. The system of claim 15, wherein the comparer is further configured to:
receive a reference signal having a power level comprising the threshold power level; and
compare the power level of the sampled input signal against the power level of the reference signal to determine whether the power level of the sampled input signal is greater than the threshold power level.

17. The system of claim 16, wherein the comparer comprises a comparator configured to receive the power level of the sampled input signal and the reference signal.

18. The system of claim 15, wherein the input signal comprises a radio frequency input signal.

19. The system of claim 15, wherein the power detector comprises a root mean squared power detector.

20. The system of claim 15, wherein the radio circuitry further comprises an output switch having an output, a first input electrically coupled to the receive-circuitry, and a second input electrically coupled to the transmit-circuitry, the output switch configured to switch between the first input for the receive mode and the second input for the transmit mode.

21. The system of claim 15, wherein the radio circuitry further comprises a diplexer electrically coupled to the receive-circuitry and the transmit-circuitry, the diplexer configured to direct receive-communications to the receive-circuitry and direct transmit-communications from the transmit-circuitry to an output terminal for transmission from the radio circuitry.

22. The system of claim 15, wherein the radio circuitry further comprises:
a local oscillator in communication with the receive-circuitry, the local oscillator configured to provide a receiver oscillation frequency to the receiver-circuitry for the receive mode; and
a frequency converter configured to up-convert or down-convert the receive-communication received by the receive-circuitry for the receive mode, the frequency converter using the receiver oscillation frequency provided from the local oscillator.

23. The system of claim 15, wherein the radio circuitry further comprises:
a local oscillator in communication with the transmit-circuitry, the local oscillator configured to provide a transmitter oscillation frequency to the transmit-circuitry for the transmit mode; and
a frequency converter configured to up-convert or down-convert the transmit-communication for transmission from the transmit-circuitry for the transmit mode, the second frequency converter using the transmitter oscillation frequency provided from the local oscillator.

24. The system of claim 15, further comprising:
an output signal coupler configured to sample the transmit-communication output from a power amplifier of the transmit-circuitry for the transmit mode; and
an output power detector electrically coupled to the output signal coupler and configured to determine a transmit power level of the sampled transmit-communication,
wherein the analog-to-digital converter is in communication with the output power detector and further configured to convert the transmit power level of the sampled transmit-communication from the analog domain to the digital domain,
wherein the controller is further configured to:
compare the power level of the sampled input signal output from the analog-to-digital converter in the digital domain against the transmit power level of the sampled transmit-communication output from the analog-to-digital converter in the digital domain to determine attenuation tuning instructions based on a difference between the power level of the sampled input signal and the transmit power level of the sampled transmit-communication, and
provide the attenuation tuning instructions to a digital step attenuator of the transmit-circuitry in communication with the controller, the attenuation tuning instructions causing the transmit-circuitry to increase or decrease a fixed output power for transmitting transmit-communications.

25. The system of claim 15, wherein the comparer comprises:
an analog-to-digital converter in communication with the power detector, the analog-to-digital converter configured to convert the sampled input signal from the analog domain to the digital domain; and a controller configured to determine whether the sampled input signal output from the analog-to-digital circuit corresponds to a downlink packet or an uplink packet.

26. The system of claim 15, wherein the receive-circuitry receives the receive-communication from user equipment over a long-term evolution network and the transmit-circuitry transmits the transmit-communication to the user equipment over the long-term evolution network.

27. The system of claim 15, wherein the controller causes the input switch to switch to the first output for the receive mode by default.

28. The system of claim 15, wherein one or more power amplifiers at the transmit-circuitry are powered off during the receive mode.

* * * * *